United States Patent
Mano et al.

(10) Patent No.: US 9,441,672 B2
(45) Date of Patent: Sep. 13, 2016

(54) METHOD FOR PRODUCING HOLDER AND HOLDER

(71) Applicant: NTN Corporation, Osaka (JP)

(72) Inventors: Yoshiya Mano, Shizuoka (JP); Hiroshi Nakahashi, Shizuoka (JP); Kouhei Kondou, Shizuoka (JP); Hajime Kawamura, Shizuoka (JP); Shingo Kinpara, Shizuoka (JP); Yasunori Yamamoto, Shizuoka (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 14/384,918

(22) PCT Filed: Mar. 6, 2013

(86) PCT No.: PCT/JP2013/056162
§ 371 (c)(1),
(2) Date: Sep. 12, 2014

(87) PCT Pub. No.: WO2013/137086
PCT Pub. Date: Sep. 19, 2013

(65) Prior Publication Data
US 2015/0036961 A1    Feb. 5, 2015

(30) Foreign Application Priority Data

Mar. 16, 2012    (JP) .................................. 2012-059988

(51) Int. Cl.
*B21D 41/02* (2006.01)
*B21D 53/12* (2006.01)
(Continued)

(52) U.S. Cl.
CPC ........... *F16C 33/541* (2013.01); *B21D 41/026* (2013.01); *B21D 53/12* (2013.01);
(Continued)

(58) Field of Classification Search
CPC .... B21D 53/12; B21D 41/02; B21D 41/026; B21D 17/025; B21D 22/025; B21K 1/05; B21J 15/02; B21J 15/025; B21J 5/08; B21J 5/12
See application file for complete search history.

(56) References Cited

U.S. PATENT DOCUMENTS

2008/0219611 A1    9/2008    Ootsuka et al.
2008/0302164 A1    12/2008    Bauer et al.
(Continued)

FOREIGN PATENT DOCUMENTS

CN    101166916    4/2008
JP    3-169442      7/1991
(Continued)

OTHER PUBLICATIONS

Extended European Search Report issued Dec. 8, 2015 in corresponding European patent application No. 13 76 0505.
(Continued)

*Primary Examiner* — Debra Sullivan
(74) *Attorney, Agent, or Firm* — Wenderoth, Lind & Ponack, L.L.P.

(57) ABSTRACT

A method for producing a holder in which sagging is suppressed in a bent part to be formed into a flange portion, without using bulge forming and a split mold that restrains the inside of a working target article; and a holder. An upper punch presses and bends one end portion of a working target article inward, whereby a flange portion is formed in the one end portion. A smaller-diameter portion of the working target article is restrained from the inside and outside by a lower punch and split mold portions. Then, a peripheral surface portion of a convex portion of the upper punch receives the end portion of the working target article and applies an outward pressure to the end portion. A bent part is pushed toward a larger-diameter portion restraining part of a split die, so that sagging is prevented from occurring in the bent part.

9 Claims, 13 Drawing Sheets

(51) Int. Cl.
*F16C 33/54* (2006.01)
*F16C 19/26* (2006.01)
*F16C 19/46* (2006.01)

(52) U.S. Cl.
CPC ............ *F16C 19/26* (2013.01); *F16C 33/543* (2013.01); *F16C 33/546* (2013.01); *F16C 19/463* (2013.01); *F16C 2220/42* (2013.01); *F16C 2220/46* (2013.01); *F16C 2220/84* (2013.01); *F16C 2240/60* (2013.01); *Y10T 29/49691* (2015.01)

(56) References Cited

U.S. PATENT DOCUMENTS

| | | | |
|---|---|---|---|
| 2009/0003751 A1* | 1/2009 | Auffahrt | F16C 19/46 384/575 |
| 2010/0278471 A1 | 11/2010 | Oishi et al. | |
| 2010/0278472 A1* | 11/2010 | Oishi et al. | 384/572 |

FOREIGN PATENT DOCUMENTS

| | | |
|---|---|---|
| JP | 2000-257638 | 9/2000 |
| JP | 2005-233317 | 9/2005 |
| JP | 2006-7246 | 1/2006 |
| JP | 2008-64249 | 3/2008 |
| JP | 4246310 | 1/2009 |
| JP | 2009-264400 | 11/2009 |
| JP | 4442547 | 1/2010 |
| JP | 2011-133095 | 7/2011 |
| WO | 2009/084478 | 7/2009 |

OTHER PUBLICATIONS

Notification of International Preliminary Report on Patentability and Translation of Written Opinion of the International Searching Authority issued Sep. 25, 2014 in International Application No. PCT/JP2013/056162.

International Search Report issued May 28, 2013 in International (PCT) Application No. PCT/JP2013/056162.

Office Action issued May 6, 2015 in Chinese Application No. 201380014299.X, with English translation.

* cited by examiner

METHOD FOR PRODUCING HOLDER AND HOLDER

TECHNICAL FIELD

The present invention relates to a method for producing a holder that holds a roller in a roller bearing and a holder.

BACKGROUND ART

As illustrated in FIG. 13, a holder 100 includes: a pair of ring-shaped side portions 101 opposed to each other; and pillar portions 102 that integrally couple the pair of ring-shaped side portions 101. As also illustrated in FIG. 14, pockets 103 are respectively formed between the large number of pillar portions 102, and a needle roller 90 is inserted into each pocket 103.

Each pillar portion 102 includes: a larger-diameter portion formed at both the ends thereof, the larger-diameter portion having the same diameter as that of the ring-shaped side portions 101; a smaller-diameter portion formed in the center thereof; and an inclined portion formed between the larger-diameter portion and the smaller-diameter portion of the pillar portion 102. Further, a flange portion 104 is formed by bending an end portion of each ring-shaped side portion 101 inward. Because the holder 100 has such a shape as described above, a cross sectional shape of the holder 100 is an M shape, and the holder 100 is referred to as an M-type holder.

FIG. 15A, FIG. 15B, and FIG. 15C illustrate a conventional method for producing the above-mentioned M-type holder 100. A working target article 200 to be formed into the holder 100 is set onto a lower punch 300. The diameter of an upper end portion 300a of the lower punch 300 is the same as the inner diameter of the smaller-diameter portion of the holder 100. Moreover, the diameter of a middle portion 300b of the lower punch 300 is the same as the inner diameter of the larger-diameter portion of the holder 100. Then, an inclined portion 300c corresponding to the inclined portion of the holder 100 is formed between the upper end portion 300a and the middle portion 300b. Moreover, the diameter of a base end portion 300d of the lower punch 300 is the same as the outer diameter of the larger-diameter portion of the holder 100, and the working target article 200 is supported by the base end portion 300d. Moreover, a die 301 is provided around the lower punch 300, and the periphery of the working target article 200 is restrained by the die 301. Further, an upper punch 302 is provided above the lower punch 300.

Here, as illustrated in FIG. 15B, if the upper punch 302 moves downward, an upper end portion of the working target article 200 is pressed downward to be gradually bent inward.

Then, as illustrated in FIG. 15C, if the upper punch 302 moves further downward, the flange portion 104 is formed in the upper end portion of the working target article 200.

As illustrated in an enlarged manner in FIG. 16A, a thinned portion 200a is formed in a part to be formed into the flange portion 104, of the working target article 200 used in the method for producing the M-type holder 100. The reason why the thinned portion 200a is formed as described above is to enhance the bending formability. Consequently, as illustrated in FIG. 16B, sagging (the phenomenon in which the radius of curvature of a bent portion becomes larger than that of a plate thickness) can be prevented from occurring in a bent portion (R portion) 100a, when the flange portion 104 is formed.

In the above-mentioned method, in the case where the amount of compression by the upper punch 302 is increased in order to further suppress sagging, the working target article 200 deforms because of insufficient restraint of the smaller-diameter portion of the working target article 200. To deal with such deformation, post-processing of removing a part indicated by diagonal lines in FIG. 16C is required, and this decreases the yield and productivity.

A producing method in which a split mold for restraining the inside of the working target article 200 is used is known as a producing method capable of suppressing the occurrence of such sagging (see Patent Literature 1). FIG. 17A, FIG. 17B, and FIG. 17C are explanatory views illustrating a producing method in which a split mold 304 is used. In this producing method, the working target article 200 is set into a periphery restraining mold 303 having the same inner diameter as the outer diameter of the larger-diameter portion of the working target article 200. An outer peripheral surface portion having the same diameters as the inner diameter of the larger-diameter portion and the inner diameter of the smaller-diameter portion of the working target article 200 is formed in each split portion 304a of the split mold 304. Moreover, the split mold 304 can move upward and downward, and the split portions 304a of the split mold 304 can move also in the radial direction as also illustrated in FIG. 18.

Moreover, a producing method in which bulge forming is used is also known as another producing method of this type (see Patent Literature 2 and Patent Literature 3).

CITATION LIST

Patent Literature

Patent Literature 1: Japanese Patent Laid-Open No. H03-169442
Patent Literature 2: Japanese Patent Laid-Open No. 2000-257638
Patent Literature 3: Japanese Patent Laid-Open No. 2006-7246

SUMMARY OF INVENTION

Technical Problem

In the producing method in which the split mold 304 is used, it is necessary to insert the split mold 304 while avoiding the smaller-diameter portion of the working target article 200, and hence high accuracy is required for the movement of the split mold 304. Moreover, the number of splits needs to be increased in order to sufficiently restrain the inside of the working target article 200, but this makes a mold structure more complicated, resulting in a disadvantage that such a complicated structure is not suitable for production of small holders.

Moreover, the bulge forming has a disadvantage that the life of an elastic body (not illustrated) inserted into the working target article 200 is short and that the productivity is low. Moreover, the bulge forming has another disadvantage that the elastic body cannot apply a sufficient pressure to the working target article 200.

The present invention has an object to provide: a method for producing a holder in which sagging is suppressed in a bent part to be formed into a flange portion, without using bulge forming and a split mold that restrains the inside of a working target article; and a holder.

Solution to Problem

In order to achieve the above-mentioned object, a method for producing a holder according to the present invention includes: receiving an inner peripheral surface of at least a smaller-diameter portion of a working target article in which a flange portion is yet to be formed, by an outer peripheral surface of a receiving member inserted into the working target article, the working target article including the smaller-diameter portion, a larger-diameter portion, and an inclined portion that connects the smaller-diameter portion and the larger-diameter portion; receiving an outer peripheral surface of the smaller-diameter portion and an outer peripheral surface of the larger-diameter portion of the working target article, by a die placed on an outer peripheral side of the working target article; pressing, in the receiving state, an end portion of the working target article by a pressing member for flange portion formation; and forming the flange portion while a peripheral surface portion of a convex portion formed in the pressing member receives the end portion and applies an outward pressure to the end portion.

According to such a method, when the end portion of the working target article is pressed by the pressing member for flange portion formation, the inner peripheral surface of the smaller-diameter portion of the working target article is received by the outer peripheral surface of the receiving member inserted into the working target article, and the outer peripheral surface of the smaller-diameter portion and the outer peripheral surface of the larger-diameter portion of the working target article are received by the die. Hence, even without the need to make thinner the end portion to be formed into the flange portion, of the working target article, the bending operation for forming the flange portion can be performed. Then, the peripheral surface portion of the convex portion formed in the pressing member receives the end portion and applies the outward pressure to the end portion. Hence, the end portion to be formed into the flange portion is pushed toward a restrained part on the outer peripheral surface of the larger-diameter portion. That is, the material of the end portion is pushed toward a bent part of the flange portion, so that occurrence of sagging is suppressed.

In the method for producing a holder, the end portion may be pressed by the pressing member such that surface roughness of an end surface of the flange portion is influenced by surface roughness of the peripheral surface portion of the convex portion. With this configuration, if the surface roughness of the peripheral surface portion of the convex portion is made smaller, the surface roughness of the end surface of the flange portion can be made smaller.

In the method for producing a holder, the end portion may be pressed by the pressing member such that a thickness of a bent part of the end portion is larger than a plate thickness of the working target article. With this configuration, a thicker portion is formed in the bent part of the end portion, and the strength of the holder is enhanced.

In the method for producing a holder, the die may include a movable split die, and the outer peripheral surface of the smaller-diameter portion and the outer peripheral surface of the larger-diameter portion of the working target article may be received by the split die. Alternatively, the die may include a movable split die and a fixed die, the outer peripheral surface of the smaller-diameter portion of the working target article may be received by the split die, and the outer peripheral surface of the larger-diameter portion of the working target article may be received by the fixed die.

The method for producing a holder may include: using a first receiving member as the receiving member when the flange portion is formed in one end portion of the working target article, the first receiving member including: a smaller-diameter mold portion having the same diameter as an inner diameter of the smaller-diameter portion of the working target article; and a larger-diameter mold portion having the same diameter as an inner diameter of the larger-diameter portion of the working target article; and using a second receiving member as the receiving member when the flange portion is formed in another end portion of the working target article having the one end portion in which the flange portion is formed, the second receiving member including a smaller-diameter mold portion having the same diameter as the inner diameter of the smaller-diameter portion of the working target article. Alternatively, the method for producing a holder may include: using, as the receiving member, a receiving member including a smaller-diameter mold portion having the same diameter as an inner diameter of the smaller-diameter portion of the working target article; and simultaneously operating two pressing members that are placed so as to sandwich the working target article, to thereby simultaneously form the flange portions in both end portions of the working target article.

The method for producing a holder may include press working using a rough finishing diameter enlarging mold member including an inclined portion forming portion having an inclination angle gentler than an inclination angle of the inclined portion of the working target article, at a stage at which the larger-diameter portion of the working target article is formed. It is desirable that the angle of the inclined portion forming portion be 40 to 70% of the inclination angle of the inclined portion of the working target article.

Moreover, a holder according to the present invention includes: a smaller-diameter portion; a larger-diameter portion; an inclined portion that connects the smaller-diameter portion and the larger-diameter portion; a flange portion formed in an end portion thereof; and a pocket into which a roller is inserted, the pocket being formed across the smaller-diameter portion, the larger-diameter portion, and the inclined portion. A thickness of a bent part of the flange portion is made larger than a plate thickness of an unbent part adjacent to the bent part. According to such a holder, because the thickness of the bent part is made larger, the strength thereof is enhanced.

Advantageous Effects of Invention

The present invention produces various effects such as an effect of producing a holder in which sagging is suppressed in a bent part to be formed into a flange portion, without using bulge forming and a split mold that restrains the inside of a working target article.

DESCRIPTION OF EMBODIMENTS

Hereinafter, an embodiment of the present invention is described with reference to the accompanying drawings.

Figure 1:
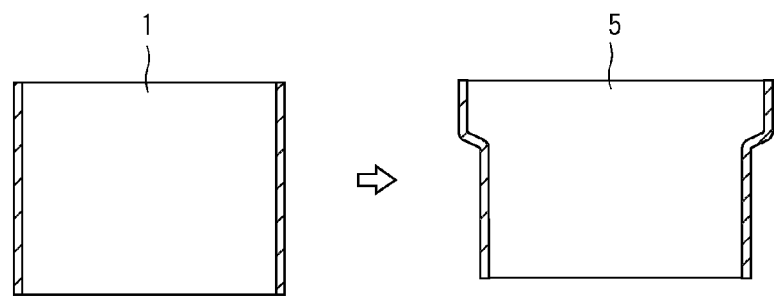
FIG. 1 is a view illustrating an embodiment of the present invention, which is an explanatory view illustrating a working stage of a one-end diameter enlarged article.
Figure 2:
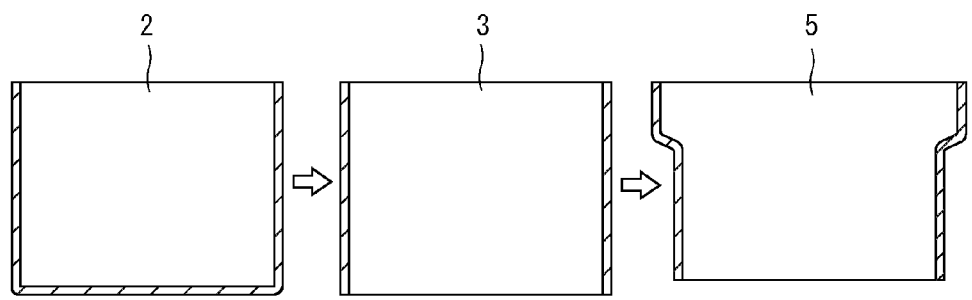
FIG. 2 is a view illustrating the embodiment of the present invention, which is an explanatory view illustrating a working stage of the one-end diameter enlarged article.
Figure 3:
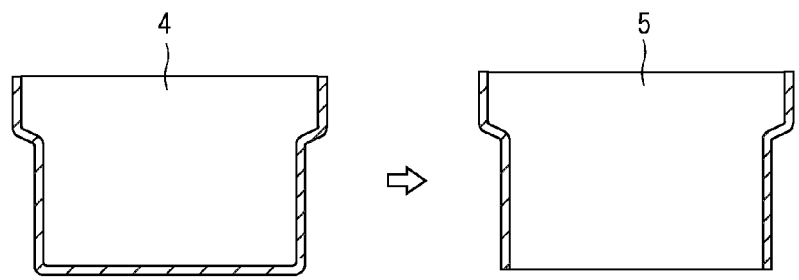
FIG. 3 is a view illustrating the embodiment of the present invention, which is an explanatory view illustrating a working stage of the one-end diameter enlarged article.
Figure 7:
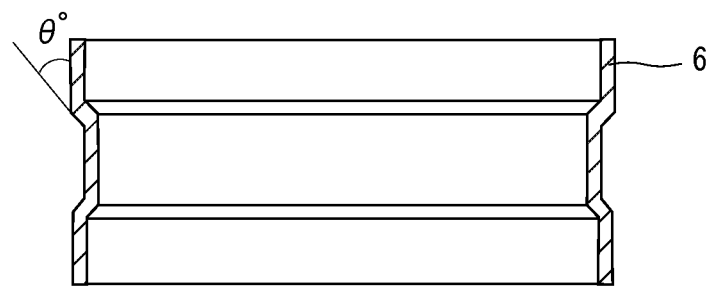
FIG. 7 is a view illustrating the embodiment of the present invention, which is a cross sectional view illustrating the both-end diameter enlarged article (working target article).

In a method for producing a holder according to the present embodiment, the holder is produced by forming a flange portion in such a working target article 6 as illustrated in FIG. 7, and a one-end diameter enlarged article 5 is made as illustrated in FIG. 1, FIG. 2, and FIG. 3, in order to obtain the working target article 6. In the making method illustrated in FIG. 1, the one-end diameter enlarged article 5 is made by press-forming a circular tube 1 cut into a predetermined length. Moreover, in the making method illustrated in FIG. 2, a circular tube member 3 is made by removing a bottom of a cup-shaped member 2 formed by drawing, and the one-end diameter enlarged article 5 is made by press-forming the circular tube member 3. Moreover, in the making method illustrated in FIG. 3, the one-end diameter enlarged article 5 is made by removing a bottom of a one-end diameter enlarged bottomed cylindrical member 4 formed by drawing.

Figure 4A:
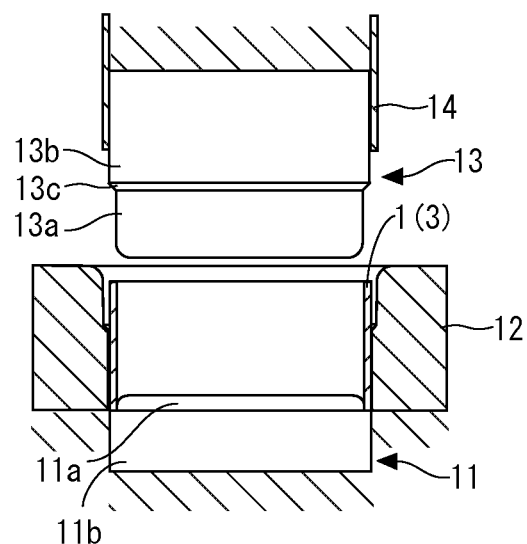
FIG. 4A and FIG. 4B are views illustrating the embodiment of the present invention, which are explanatory views illustrating a step of making the one-end diameter enlarged article through press working using a mold.
Figure 4B:
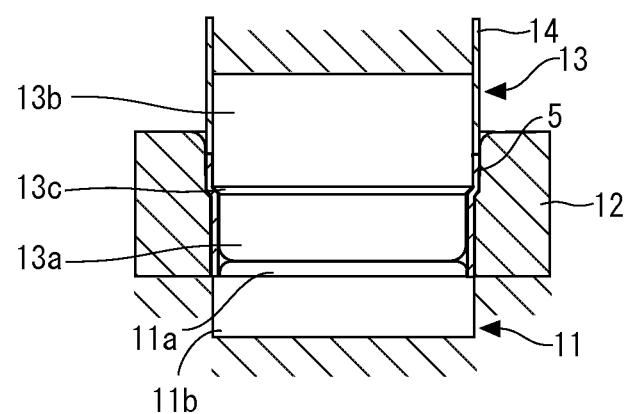

FIG. 4A and FIG. 4B are explanatory views illustrating a step of making the one-end diameter enlarged article 5 from the circular tube 1 or the circular tube member 3. The circular tube 1 or the circular tube member 3 is set onto a lower punch 11. The diameter of an upper end portion 11a of the lower punch 11 is the same as the inner diameter of the circular tube 1 or the circular tube member 3. Moreover, the diameter of a base end portion 11b of the lower punch 11 is the same as the outer diameter of the circular tube 1 or the circular tube member 3, and the circular tube 1 or the circular tube member 3 is supported by the base end portion 11b.

A die 12 is placed on the lower punch 11. The inner diameter from a middle portion to a lower portion of the die 12 is the same as the outer diameter of the circular tube 1 or the circular tube member 3, and an outer peripheral surface of the circular tube 1 or the circular tube member 3 is restrained by this inner-diameter portion. Moreover, the inner diameter of an upper portion of the die 12 is the same as the outer diameter of a larger-diameter portion of the working target article 6 illustrated in FIG. 7.

Further, an upper punch 13 is provided above the lower punch 11. The diameter of a lower end portion 13a of the upper punch 13 is the same as the inner diameter of the circular tube 1 or the circular tube member 3, and an inner peripheral surface of the circular tube 1 or the circular tube member 3 is restrained by this inner-diameter portion. Moreover, the diameter of a base end portion 13b of the upper punch 13 is the same as the inner diameter of the larger-diameter portion of the working target article 6. Then, an inclined portion forming portion 13c corresponding to an inclined portion of the working target article 6 is formed between the lower end portion 13a and the base end portion 13b. Moreover, a cylindrical mold member 14 that presses an upper end surface of the working target article 6 from above is provided around the upper punch 13.

In the press working illustrated in FIG. 4A and FIG. 4B, the upper punch 13 is press-fitted into the circular tube 1 or the circular tube member 3, whereby the one-end diameter enlarged article 5 is made. Moreover, because the mold member 14 is provided, the mold member 14 presses the upper end of the one-end diameter enlarged article 5, in the state of FIG. 4B. Hence, the inside of a mold space formed by the inclined portion forming portion 13c is filled with the material of the one-end diameter enlarged article 5 without any gap, so that a desired inclination shape is secured.

Figure 5A:
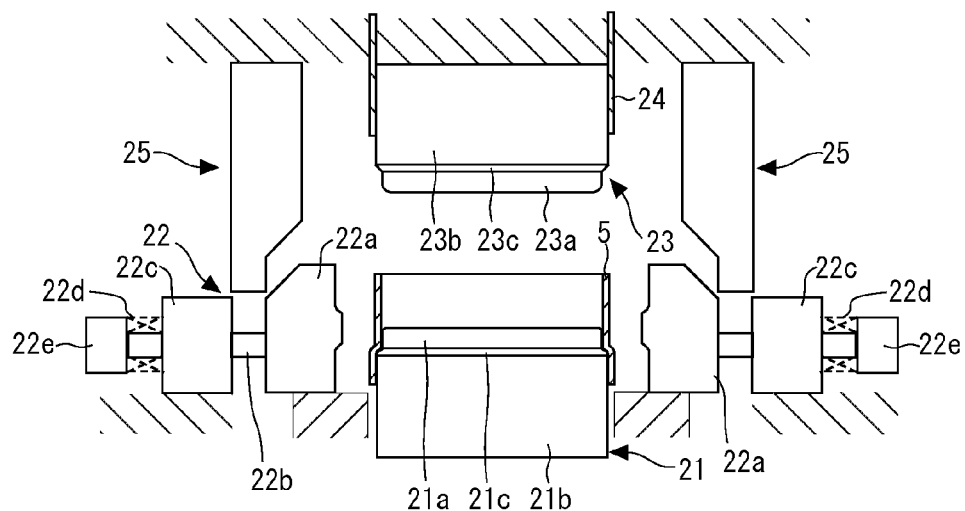
FIG. 5A, FIG. 5B, and FIG. 5C are views illustrating the embodiment of the present invention, which are explanatory views illustrating a step of making a both-end diameter enlarged article (working target article) through press working using a split die.
Figure 5B:
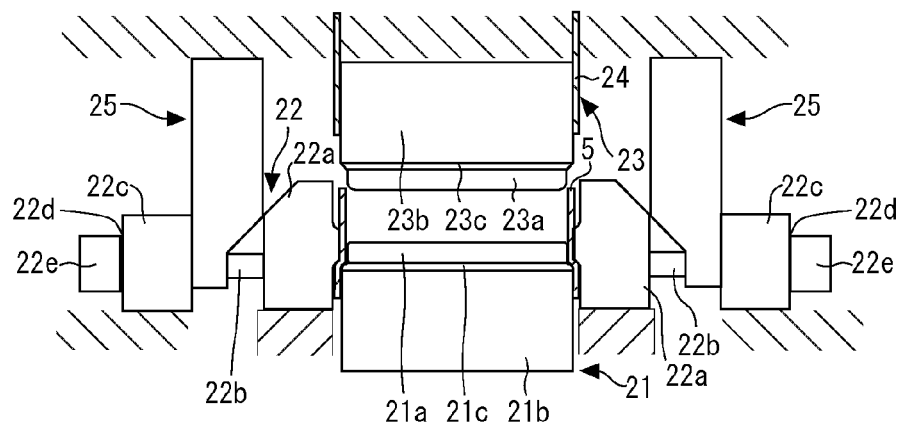
Figure 5C:
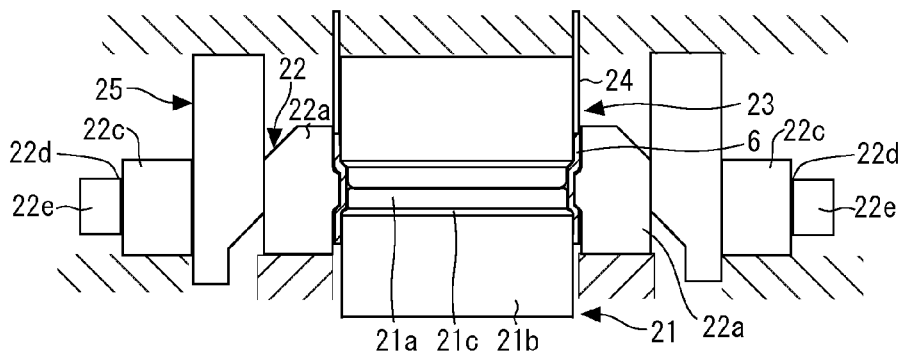

FIG. 5A, FIG. 5B, and FIG. 5C are explanatory views illustrating a step of making the working target article 6 from the one-end diameter enlarged article 5. The one-end diameter enlarged article 5 is set onto a lower punch 21 with the diameter enlarged side thereof facing downward. The diameter of an upper end portion 21a of the lower punch 21 is the same as the inner diameter of a smaller-diameter portion of the working target article 6. Moreover, the diameter of a base end portion 21b of the lower punch 21 is the same as the inner diameter of the larger-diameter portion of the working target article 6. Then, an inclined portion 21c corresponding to the inclined portion of the working target article 6 is formed between the upper end portion 21a and the base end portion 21b.

Figure 6A:
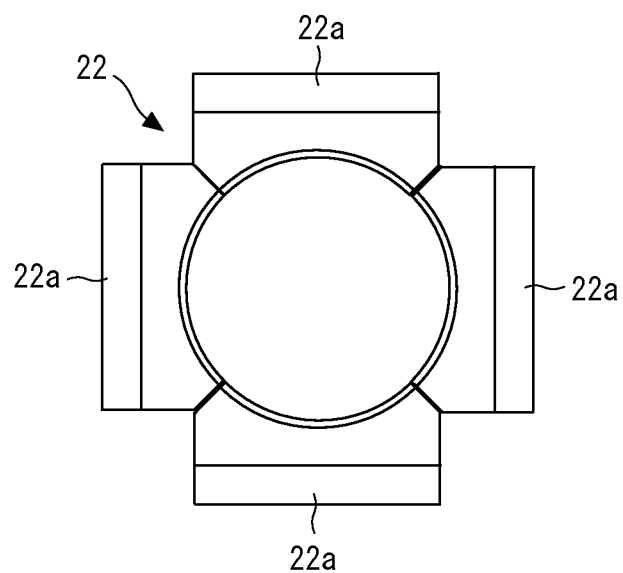
FIG. 6A and FIG. 6B are explanatory views illustrating the split die used in a mold apparatus of FIG. 5.
Figure 6B:
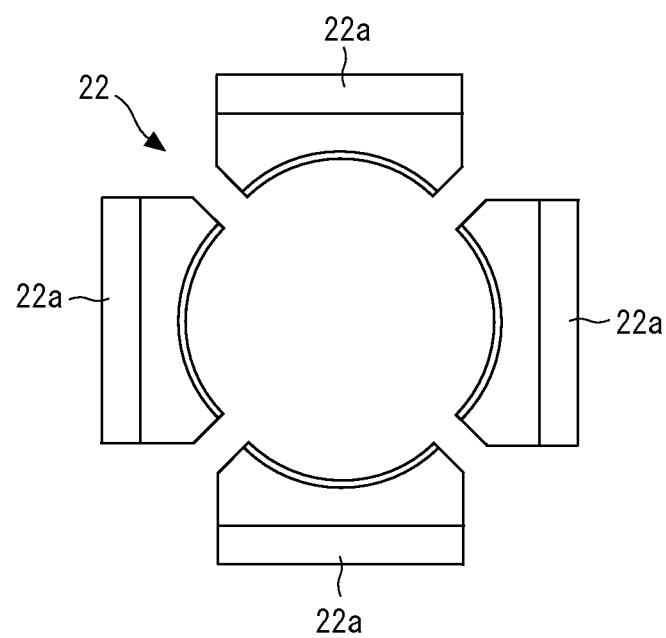

Moreover, a split die 22 is placed around the lower punch 21. As also illustrated in FIG. 6, the split die 22 includes four split mold portions 22a in a circular pattern, and forms a circular shape corresponding to the working target article 6 in the state where the four split mold portions 22a are put together. A convex portion located on the central side of an inner peripheral surface of each split mold portion 22a is formed so as to coincide with the outer diameters of the smaller-diameter portion and the inclined portion of the working target article 6, and portions below and above the convex portion of each split mold portion 22a are formed so as to coincide with the outer diameter of the larger-diameter portion of the working target article 6. A leading end of a shaft 22b is fixed to a back surface of each split mold portion 22a. Each shaft 22b moves while being guided by a guide member 22c, and the split mold portions 22a are put together and separated from one another by this movement. A spring receiver 22e is fixed to a back end of the shaft 22b, and a spring 22d is attached between the spring receiver 22e and the guide member 22c. If a pressing force of putting the split mold portions 22a together is cancelled, the split mold portions 22a are respectively moved by extension forces of the springs 22d so as to be separated from one another.

An upper punch 23 is placed above the lower punch 21. The diameter of a lower end portion 23a of the upper punch 23 is the same as the inner diameter of the smaller-diameter portion of the working target article 6. Moreover, the diameter of a base end portion 23b of the upper punch 23 is the same as the inner diameter of the larger-diameter portion of the working target article 6. Then, an inclined portion forming portion 23c corresponding to the inclined portion of the working target article 6 is formed between the lower end portion 23a and the base end portion 23b. Moreover, a cylindrical mold member 24 that presses the upper end surface of the working target article 6 from above is provided around the upper punch 23.

Moreover, a cam member 25 that moves upward and downward in conjunction with upward and downward movement of the upper punch 23 is provided lateral to the upper punch 23. The cam member 25 has a tapered shape in which the cam member 25 becomes thinner toward a leading end thereof. During a pressing operation, the cam member 25 is fitted into a space between the split mold portions 22a and the guide members 22c, to thereby apply the pressing force of putting the split mold portions 22a together.

Note that, not limited to an operation of moving the split mold portions 22a by means of the cam member 25 and the springs 22d, the split mold portions 22a may be moved by means of a driving cylinder.

If the upper punch 23 and the cam member 25 move downward, the split mold portions 22a are guided so as to be put together, the periphery of the one-end diameter enlarged article 5 is restrained, and the upper punch 23 is press-fitted into the one-end diameter enlarged article 5, whereby the working target article 6 having both the ends at which the diameter is enlarged is made. Moreover, because the mold member 24 is provided, the mold member 24 presses the upper end of the working target article 6. Hence, the inside of a mold space formed by the inclined portion forming portion 23c is filled with the material of the working target article 6 without any gap, so that a desired inclination shape is secured.

Figure 8A:
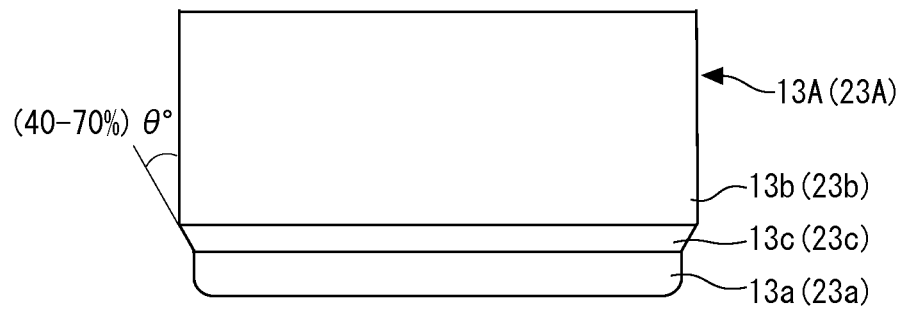
FIG. 8A and FIG. 8B are views illustrating the embodiment of the present invention, which are explanatory views illustrating an upper punch that can be used to obtain the one-end diameter enlarged article or the both-end diameter enlarged article (working target article).
Figure 8B:
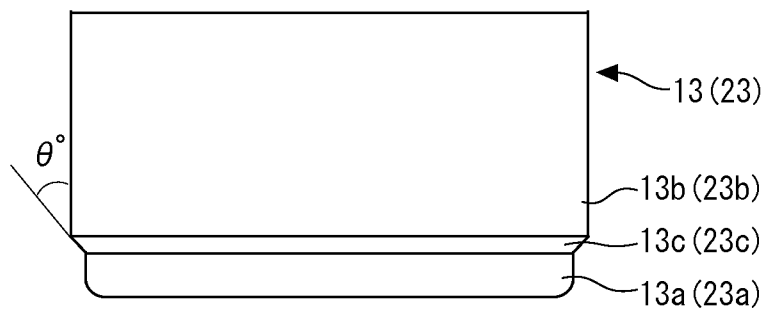

Assuming that the inclination angle of the inclined portion of the working target article 6 illustrated in FIG. 7 is θ°, it is also possible to use: a rough forming punch 13A (23A) including an inclined portion forming portion 13c (23c) having an angle less than the angle θ° (illustrated in FIG. 8A); and the upper punch for finishing 13 (23) including an inclined portion forming portion 13c (23c) having the angle θ° (illustrated in FIG. 8B). The inclined portion forming portion 13c (23c) of the rough forming punch 13A (23A) is set to, for example, 40 to 70% of the angle θ°. The press forming operation of FIG. 4A and FIG. 4B and the press forming operation of FIG. 5A, FIG. 5B, and FIG. 5C are performed as rough forming once or a plurality of times using the rough forming punch 13A (23A). Then, the press forming operation of FIG. 4A and FIG. 4B and the press forming operation of FIG. 5A, FIG. 5B, and FIG. 5C are performed as finishing forming using the upper punch 13 (23). In this way, a stress generated in the forming for diameter enlargement can be made smaller, and galling can be suppressed from occurring in the working target article 6. If the rough forming is performed with the angle of the inclined portion forming portion 13c (23c) of the rough forming punch 13A (23A) being set to 40% or lower of the inclination angle of the inclined portion of the working target article 6, galling may occur in the working target article 6 and the mold in the subsequent finishing step. Meanwhile, if the rough forming is performed with the angle thereof being set to 70% or higher thereof, galling may occur in the working target article 6 and the mold during the rough forming. Accordingly, if the inclined portion forming portion 13c (23c) of the rough forming punch 13A (23A) is set to 40 to 70% of the angle θ° as described above, the occurrence of such galling can be suppressed.

Note that, although the working target article 6 is made by press forming in the above-mentioned example, the present invention is not limited thereto, and the working target article 6 may be made by rolling a circular tube or the like.

Figure 9A:
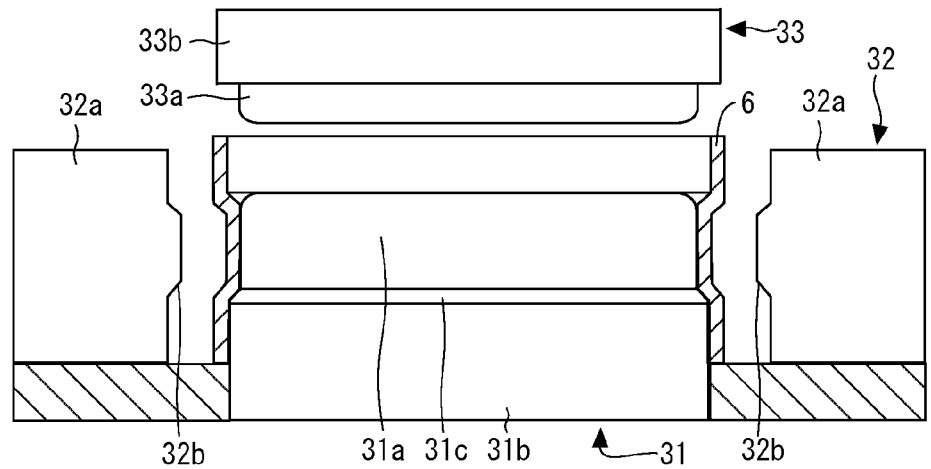
FIG. 9A, FIG. 9B, and FIG. 9C are views illustrating the embodiment of the present invention, which are explanatory views illustrating a step of forming a flange portion in the working target article.
Figure 9B:
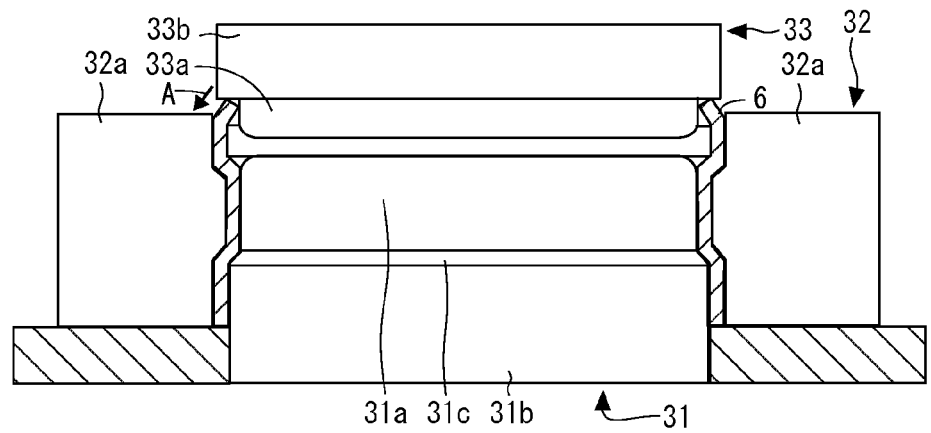
Figure 9C:
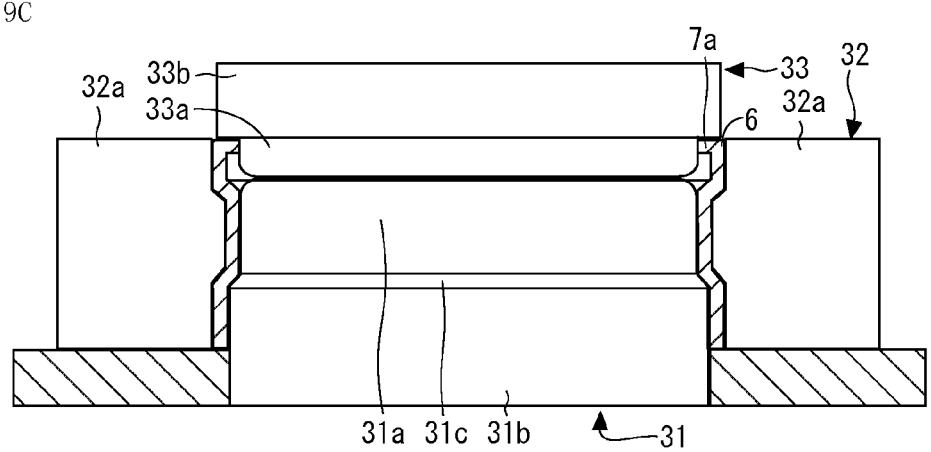
Figure 10:
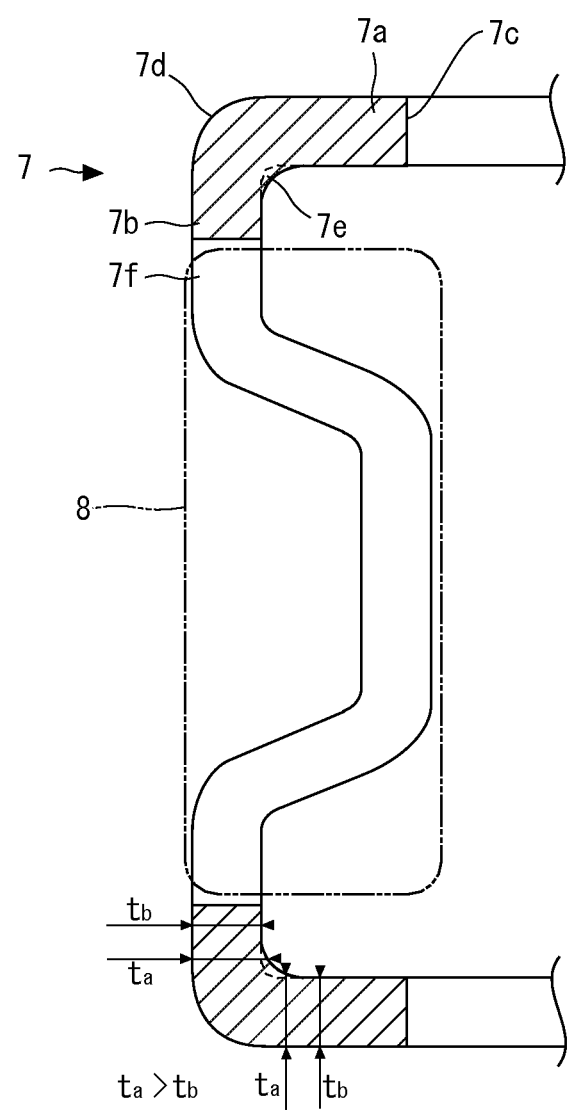
FIG. 10 is a view illustrating the embodiment of the present invention, which is a cross sectional view illustrating part of a holder and a needle roller.

FIG. 9A, FIG. 9B, and FIG. 9C are explanatory views illustrating a step of producing a holder 7 illustrated in FIG. 10 from the working target article 6. The working target article 6 is set onto a lower punch 31. The diameter of an upper end portion 31a of the lower punch 31 is the same as the inner diameter of a smaller-diameter portion of the holder 7. Moreover, the diameter of a base end portion 31b of the lower punch 31 is the same as the inner diameter of a larger-diameter portion of the holder 7. Then, an inclined portion 31c corresponding to an inclined portion of the holder 7 is formed between the upper end portion 31a and the base end portion 31b.

Moreover, a split die 32 is provided around the lower punch 31. The split die 32 includes a plurality of split mold portions 32a. A convex portion 32b located on the central side of an inner peripheral surface of each split mold portion 32a is formed so as to coincide with the outer diameters of the smaller-diameter portion and the inclined portion of the holder 7, and portions below and above the convex portion 32b of each split mold portion 32a are formed so as to coincide with the outer diameter of the larger-diameter portion of the holder 7. A driving mechanism of the split die 32 can have a configuration similar to that of the driving mechanism for the split die 22 illustrated in FIG. 5A, FIG. 5B, FIG. 5C, and FIG. 6, but is not limited to such a configuration.

An upper punch 33 is placed above the lower punch 31. The diameter of a convex portion 33a of the upper punch 33 is smaller than the inner diameter of a larger-diameter portion 7b of the holder 7 illustrated in FIG. 10, and is the same as the diameter of a circular opening defined by an end surface 7c of a flange portion 7a of the holder 7. Moreover, the diameter of a main body portion 33b of the upper punch 33 is equivalent to the outer diameter of the larger-diameter portion 7b of the holder 7, and a step-like receiving region is formed by a lower end surface of the main body portion 33b and a peripheral surface of the convex portion 33a.

In the pressing operation illustrated in FIG. 9B and FIG. 9C described above, the upper punch 33 presses and bends one end portion of the working target article 6 inward, whereby the flange portion 7a is formed in the one end portion. In this pressing operation, when the upper punch 33 presses the end portion of the working target article 6, an inner peripheral surface of the smaller-diameter portion of the working target article 6 is received (restrained) by an outer peripheral surface of the lower punch 31 inserted into the working target article 6, and an outer peripheral surface of the smaller-diameter portion and an outer peripheral surface of the larger-diameter portion of the working target article 6 are received (restrained) by the split die 32. Hence, even without the need to make the end portion of the working target article 6 thinner, the bending operation for forming the flange portion 7a of the holder 7 illustrated in FIG. 10 can be performed. Then, in this bending operation, a peripheral surface portion of the convex portion 33a of the upper punch 33 receives the end portion of the working target article 6 and applies an outward pressure to the end portion thereof (see an arrow A in FIG. 9B). Hence, a bent part 7d is pushed toward a larger-diameter portion restraining part of the split die 32, so that sagging is prevented from occurring in the bent part 7d.

Moreover, if the amount of compression (amount of press) by the upper punch 33 is increased, the material can be caused to flow to the bent part 7d, and a thicker portion 7e can be formed in the bent part 7d. That is, a thickness $t_a$ of the bent part 7d of the flange portion 7a is made larger than a plate thickness $t_b$ of an unbent part adjacent to the bent part 7d. As a matter of course, it is also possible to produce a holder having an entirely uniform thickness, without forming the thicker portion 7e.

Moreover, when the flange portion 7a is formed by the pressing operation, the end surface 7c of the flange portion 7a is received by the peripheral surface of the convex portion 33a of the upper punch 33. Hence, the accuracy of an inner peripheral circular position of the flange portion 7a can be secured by the centering accuracy of the convex portion 33a of the upper punch 33. Moreover, the end surface 7c of the flange portion 7a can be brought into pressure contact with the peripheral surface of the convex portion 33a of the upper punch 33 by the pressing operation. Hence, if the surface roughness of the peripheral surface of the convex portion 33a of the upper punch 33 is made smaller, the surface roughness of the end surface 7c of the flange portion 7a can be made smaller.

Moreover, the lower punch 31 inserted into the working target article 6 does not need to have a splittable configuration. This is suitable for production of small holders, and facilitates application to various press forming apparatuses, particularly, a transfer press apparatus.

Figure 11:
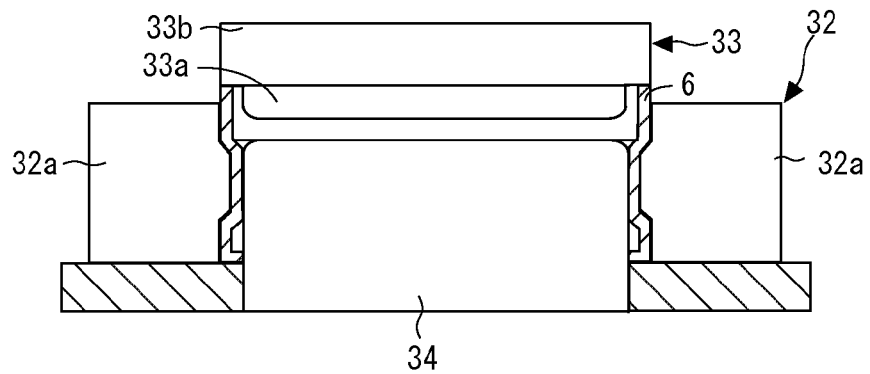
FIG. 11 is a view illustrating the embodiment of the present invention, which is an explanatory view illustrating a step of forming a flange portion at another end of the working target article having one end at which the flange portion is formed.

After the step illustrated in FIG. 9C, the flange portion 7a is further formed on the opposite side of the working target article 6, and, for example, a mold apparatus illustrated in FIG. 11 can be used for the formation. This mold apparatus corresponds to an apparatus including a lower punch 34 instead of the lower punch 31 of the mold apparatus illustrated in FIG. 9A. The diameter of the lower punch 34 is the same as the inner diameter of the smaller-diameter portion of the holder 7, and the working target article 6 can be fitted and set to the lower punch 34 from above. In the mold apparatus illustrated in FIG. 11, the upper punch 33 presses and bends another end portion of the working target article 6 inward, whereby the flange portion 7a is formed also in the another end portion. Also in this pressing operation, the smaller-diameter portion of the working target article 6 is restrained from the inside and the outside by the lower punch 34 and the split mold portions 32a, and the convex portion 33a of the upper punch 33 applies an outward pressure to the end portion of the working target article 6. Note that, as a larger frictional force is applied to among the smaller-diameter portion of the working target article 6, the lower punch 34, and the split mold portions 32a, the restraint can be more reliable.

Figure 12A:
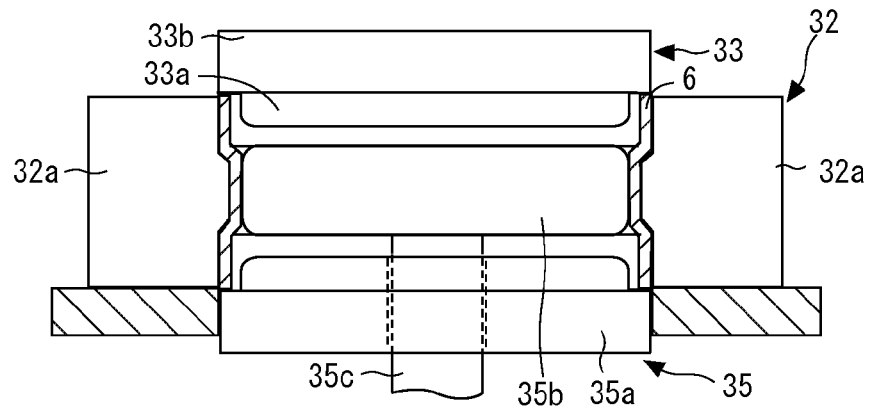
FIG. 12A and FIG. 12B are views illustrating the embodiment of the present invention, which are explanatory views illustrating a step of simultaneously forming the flange portions at both the ends of the working target article.
Figure 12B:
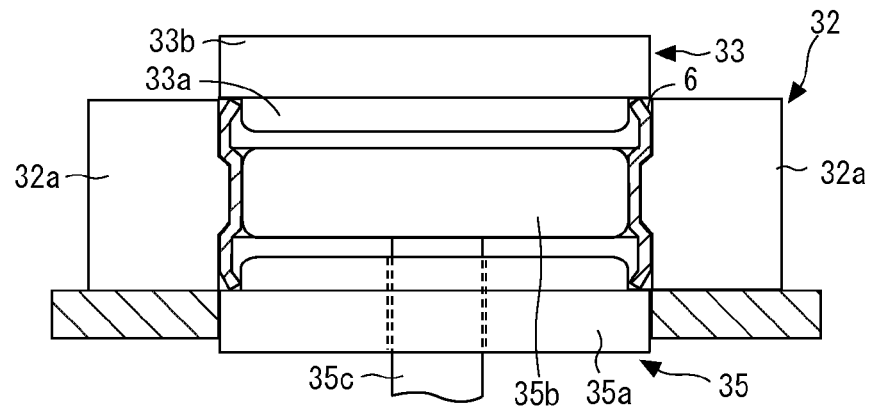
Figure 13:
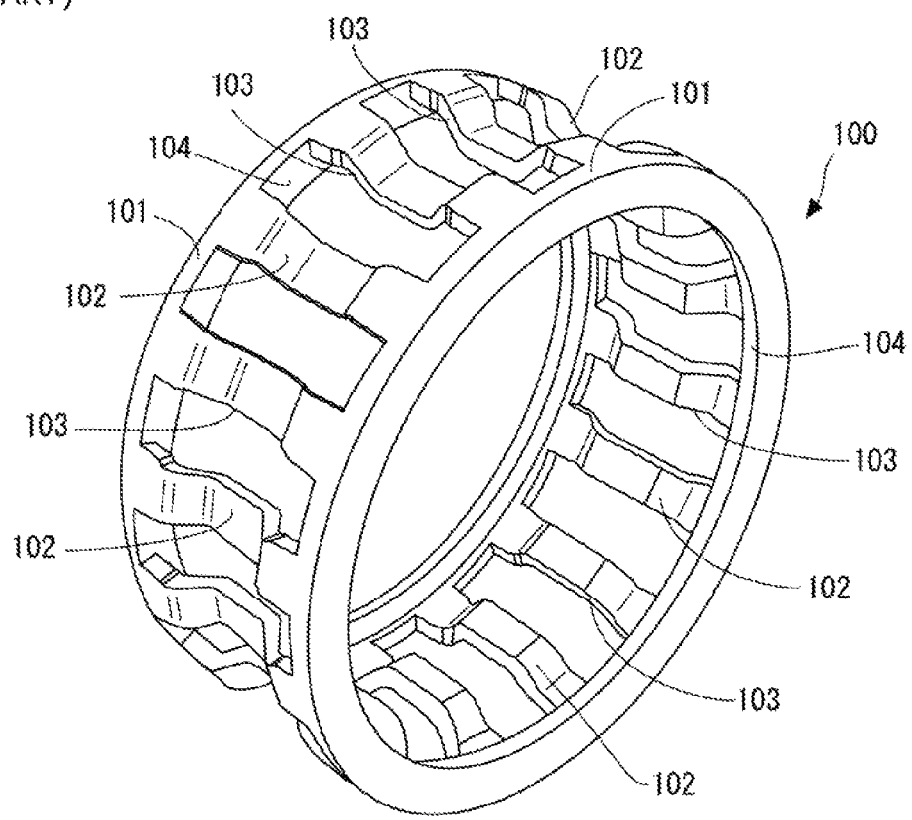
FIG. 13 is a perspective view illustrating a holder.
Figure 14:
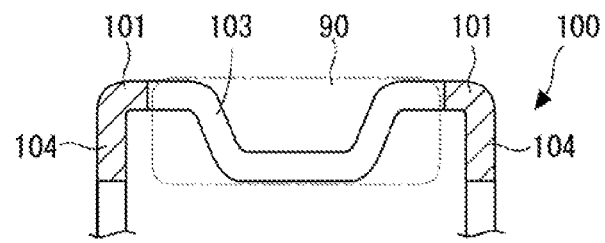
FIG. 14 is a cross sectional view illustrating part of the holder of FIG. 13.
Figure 15A:
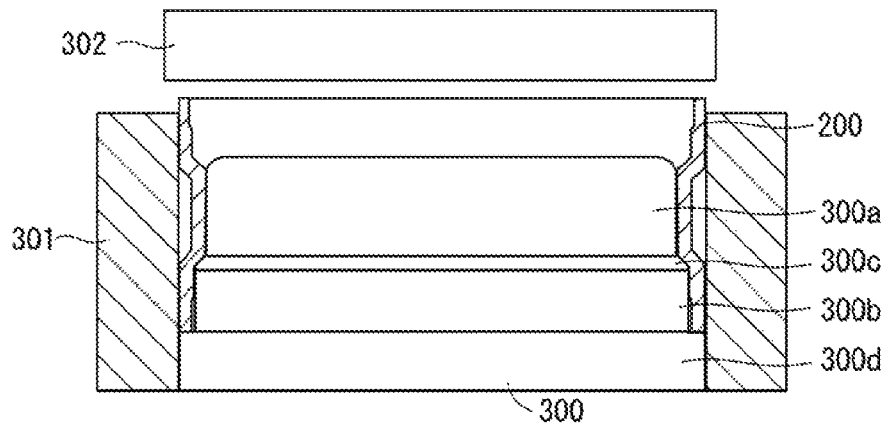
FIG. 15A, FIG. 15B, and FIG. 15C are views illustrating a conventional example, which are explanatory views illustrating a step of forming a flange portion in a working target article.
Figure 15B:
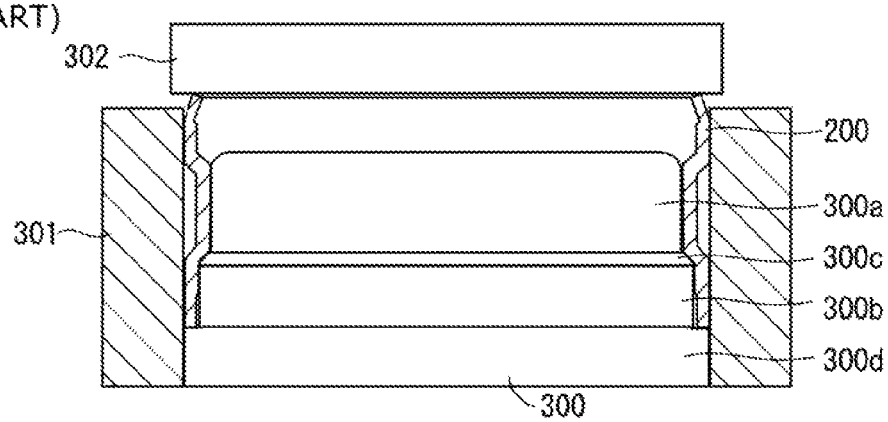
Figure 15C:
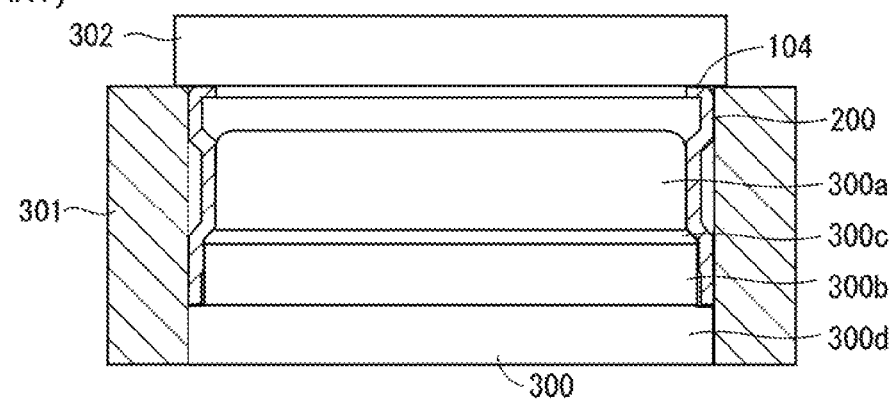
Figure 16A:
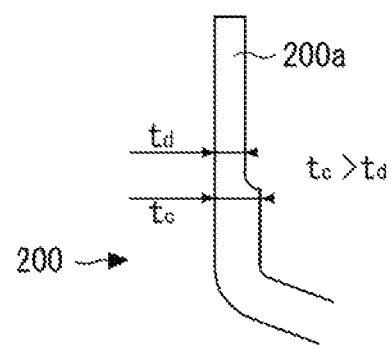
FIG. 16A, FIG. 16B, and FIG. 16C are views illustrating the conventional example, which are explanatory views illustrating part of the working target article including a thinned portion and part of the holder.
Figure 16B:
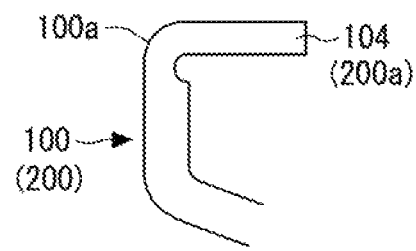
Figure 16C:
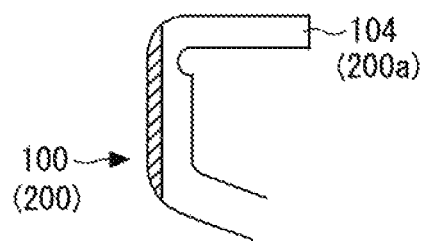
Figure 17A:
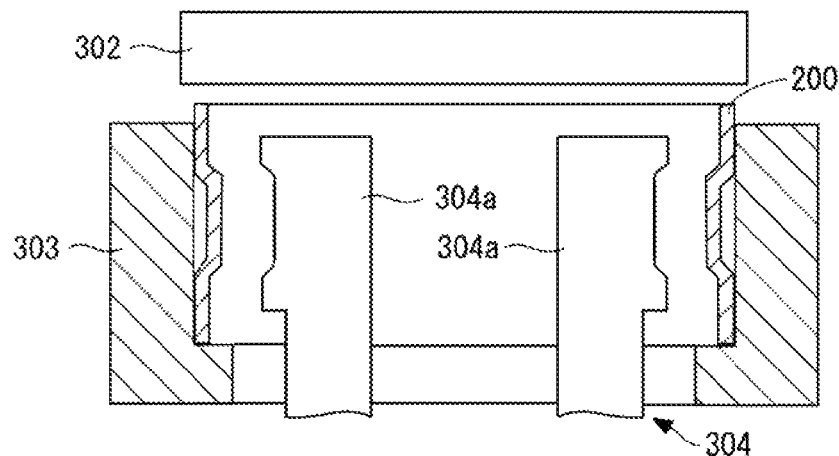
FIG. 17A, FIG. 17B, and FIG. 17C are views illustrating a conventional example, which are explanatory views illustrating a step of forming a flange portion in a working target article.
Figure 17B:
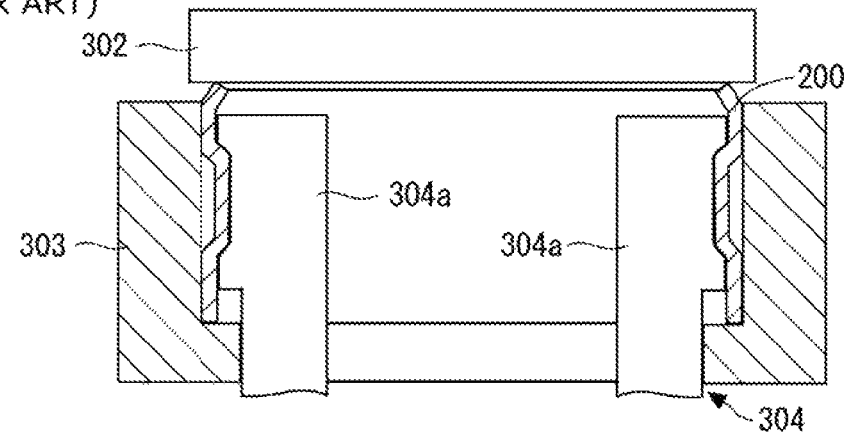
Figure 17C:
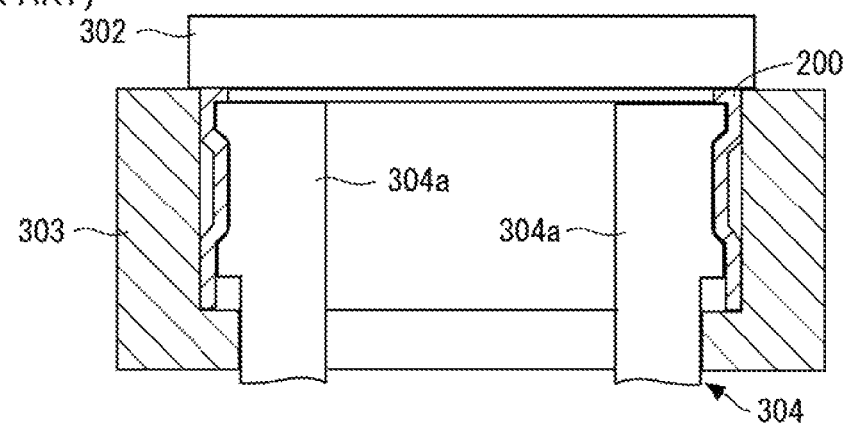
Figure 18:
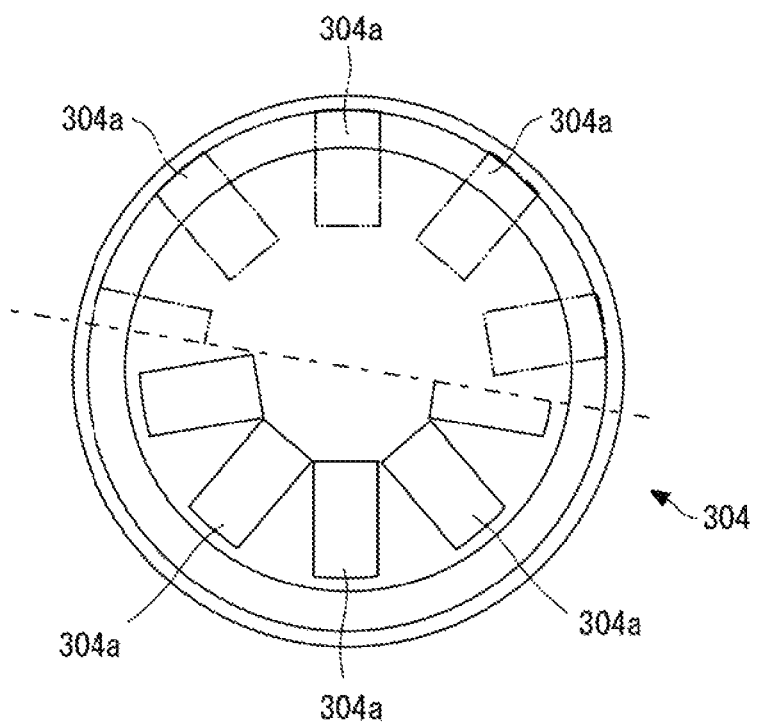
FIG. 18 is an explanatory view illustrating a split mold used in FIG. 17.

In the above-mentioned embodiment, the flange portion 7a is formed one by one on each side of the working target article 6, but the present invention is not limited thereto, and the flange portions 7a may be simultaneously formed on both the sides of the working target article 6. For example, a mold apparatus illustrated in FIG. 12A and FIG. 12B can be used for the formation. This mold apparatus corresponds to an apparatus including a lower punch 35 instead of the lower punch 34 of the mold apparatus illustrated in FIG. 11. The lower punch 35 includes: a first punch portion 35a for forming the flange portion 7a similarly to the upper punch 33; a second punch portion 35b for restraining the smaller-diameter portion of the working target article 6 from the inside similarly to the lower punch 34; and a shaft 35c fixed to a central portion of a lower surface of the second punch portion 35b. The second punch portion 35b moves together with the shaft 35c. The first punch portion 35a has a through-hole formed in a central portion thereof, and the shaft 35c is inserted through the through-hole. In the state where the second punch portion 35b is located at the position of the smaller-diameter portion of the working target article 6, the first punch portion 35a can press the end portion of the working target article 6 to form the flange portion 7a.

Note that, in the above-mentioned embodiment, the split mold portions 32a restrain the smaller-diameter portion and the larger-diameter portion of the working target article 6 from the outside, but the split mold portions 32a may restrain only the smaller-diameter portion from the outside, and a fixed die may be used to restrain the larger-diameter portion.

Moreover, as illustrated in FIG. 10, a pocket 7f into which a needle roller 8 is inserted is formed in the holder 7. The pocket 7f may be formed before the formation of the flange portion 7a, and may be formed after the formation of the flange portion 7a.

Hereinabove, the embodiment of the present invention is described with reference to the drawings, and the present invention is not limited to the embodiment illustrated in the drawings. The embodiment illustrated in the drawings can be variously modified and changed within the same range as that of the present invention or a range equivalent thereto.

REFERENCE SIGNS LIST 1 circular tube
2 cup-shaped member
3 circular tube member
4 one-end diameter enlarged bottomed cylindrical member
5 one-end diameter enlarged article
6 working target article
7 holder
7a flange portion
7b larger-diameter portion
7c end surface
7d bent part (R portion)
7e thicker portion
7f pocket
8 needle roller
11 lower punch 12 die
13 upper punch
13c inclined portion forming portion
13A rough forming punch (rough finishing diameter enlarging mold member)
21 lower punch
22 split die
23 upper punch
23c inclined portion forming portion
23A rough forming punch (rough finishing diameter enlarging mold member)
31 lower punch (receiving member, first receiving member)
31a upper end portion (smaller-diameter mold portion)
31b base end portion (larger-diameter mold portion)
32 split die
33 upper punch (pressing member)
33a convex portion
33b main body portion
34 lower punch (receiving member, second receiving member)
35 lower punch
35a first punch portion (pressing member)
35b second punch portion (receiving member)

The invention claimed is:

1. A method for producing a holder, comprising:
receiving an inner peripheral surface of at least a smaller-diameter portion of a working target article in which a flange portion is yet to be formed, by an outer peripheral surface of a receiving member inserted into the working target article, the working target article including the smaller-diameter portion, a larger-diameter portion, and an inclined portion that connects the smaller-diameter portion and the larger-diameter portion;
receiving an outer peripheral surface of the smaller-diameter portion and an outer peripheral surface of the larger-diameter portion of the working target article, by a die placed on an outer peripheral side of the working target article;
pressing, in the receiving state, an end portion of the working target article by a pressing member for flange portion formation; and
forming the flange portion while a peripheral surface portion of a convex portion formed in the pressing member receives the end portion and applies an outward pressure to the end portion.

2. The method for producing a holder according to claim 1, wherein the end portion is pressed by the pressing member such that surface roughness of an end surface of the flange portion is influenced by surface roughness of the peripheral surface portion of the convex portion.

3. The method for producing a holder according to claim 1, wherein the end portion is pressed by the pressing member such that a thickness of a bent part of the end portion is larger than a plate thickness of the working target article.

4. The method for producing a holder according to claim 1, wherein
the die includes a movable split die, and
the outer peripheral surface of the smaller-diameter portion and the outer peripheral surface of the larger-diameter portion of the working target article are received by the split die.

5. The method for producing a holder according to claim 1, wherein
the die includes a movable split die and a fixed die, the outer peripheral surface of the smaller-diameter portion of the working target article is received by the split die, and
the outer peripheral surface of the larger-diameter portion of the working target article is received by the fixed die.

6. The method for producing a holder according to claim 1, wherein the inclined portion of the working target article is formed by press working the working target article by using a rough finishing diameter enlarging mold member including an inclined portion forming portion having an inclination angle that is less than an inclination angle of the inclined portion of the working target article, at a stage at which the larger-diameter portion of the working target article is formed.

7. The method for producing a holder according to claim 6, wherein the angle of the inclined portion forming portion is 40 to 70% of the inclination angle of the inclined portion of the working target article.

8. A method for producing a holder, the method comprising:
receiving an inner peripheral surface of at least a smaller-diameter portion of a working target article in which a flange portion is yet to be formed, by an outer peripheral surface of a first receiving member inserted into the working target article, the working target article including a first end portion, a second end portion, the smaller-diameter portion, a larger-diameter portion, and an inclined portion that connects the smaller-diameter portion and the larger-diameter portion;
receiving an outer peripheral surface of the smaller-diameter portion and an outer peripheral surface of the larger-diameter portion of the working target article, by a die placed on an outer peripheral side of the working target article;
pressing, in the receiving state, the first end portion of the working target article by a pressing member for flange portion formation;
forming the flange portion while a peripheral surface portion of a convex portion formed in the pressing member receives the first end portion and applies an outward pressure to the first end portion;
using the first receiving member when the flange portion is formed in the first end portion of the working target article, the first receiving member including: a smaller-diameter mold portion having the same diameter as an inner diameter of the smaller-diameter portion of the working target article; and a larger-diameter mold portion having the same diameter as an inner diameter of the larger-diameter portion of the working target article; and
using a second receiving member when the flange portion is formed in the second end portion of the working target article having the first end portion in which the flange portion is formed, the second receiving member including a smaller-diameter mold portion having the same diameter as the inner diameter of the smaller-diameter portion of the working target article.

9. A method for producing a holder, the method comprising:
receiving an inner peripheral surface of at least a smaller-diameter portion of a working target article in which a flange portion is yet to be formed, by an outer peripheral surface of a first receiving member inserted into the working target article, the working target article including a first end portion, a second end portion, the smaller-diameter portion, a larger-diameter portion, and an inclined portion that connects the smaller-diameter portion and the larger-diameter portion;

receiving an outer peripheral surface of the smaller-diameter portion and an outer peripheral surface of the larger-diameter portion of the working target article, by a die placed on an outer peripheral side of the working target article;

pressing, in the receiving state, the first end portion of the working target article by a first pressing member for flange portion formation, and simultaneously pressing the second end portion of the working target article by a second pressing member to simultaneously form a first flange portion in the first end portion of the working target article and a second flange portion in the second end portion of the working target article;

wherein the first flange portion is formed while a peripheral surface portion of a convex portion, formed in the first pressing member, receives the first end portion and applies an outward pressure to the first end portion, wherein the second flange portion is formed while a peripheral surface portion of a convex portion, formed in the second pressing member, receives the second end portion and applies an outward pressure to the second end portion, and wherein the receiving member includes a smaller-diameter mold portion having the same diameter as an inner diameter of the smaller-diameter portion of the working target article.

* * * * *